United States Patent [19]

Molinatto

[11] Patent Number: 4,913,051

[45] Date of Patent: Apr. 3, 1990

[54] ROLL FOR USE IN ROTARY PRINTING PRESSES AND THE LIKE

[75] Inventor: Bruno Molinatto, Montalto Dora, Italy

[73] Assignee: Componenti Grafici S.r.L., Lomellina, Italy

[21] Appl. No.: 230,184

[22] Filed: Aug. 9, 1988

[51] Int. Cl.⁴ .............................................. B41F 13/10
[52] U.S. Cl. ................................ 101/376; 101/382.1; 101/401.1; 29/113.2
[58] Field of Search ............... 101/376, 375, 216, 212, 101/348, 349, 382.1, 401.1; 29/113.1, 113.2

[56] References Cited

U.S. PATENT DOCUMENTS

| | | | |
|---|---|---|---|
| 2,648,122 | 8/1953 | Hornbostel | 29/113.2 |
| 2,898,662 | 8/1959 | Robertson | 29/113.2 |
| 3,225,418 | 12/1965 | Fara | 29/113.2 |
| 3,253,323 | 5/1966 | Saueressig | 101/376.X |
| 3,295,188 | 1/1967 | Saueressig | 101/376 X |
| 3,460,221 | 8/1969 | Korsch | 29/113.1 |
| 3,633,493 | 1/1972 | Helminen | 29/113.2 |
| 3,638,292 | 2/1972 | Gaghan | 29/113.2 |
| 3,707,749 | 1/1973 | Hewley | 29/113.1 |
| 3,881,045 | 4/1975 | Strunk | 101/401.1 |
| 4,030,415 | 6/1977 | Fellows | 29/113.1 |
| 4,091,517 | 5/1978 | Lehmann et al. | 29/113.2 |
| 4,111,569 | 9/1978 | Mengel | 29/113.1 |
| 4,327,467 | 5/1982 | Quaint | 29/113.1 |
| 4,455,727 | 6/1984 | Tschirner | 29/113.1 |
| 4,794,858 | 1/1989 | Katz | 29/113.1 |

*Primary Examiner*—Eugene H. Eickholt
*Attorney, Agent, or Firm*—Peter K. Kontler

[57] ABSTRACT

A roll which can be used in conjunction with the printing cylinder in a rotary printing press to define a nip for the running web of paper or other material which is to be provided with printed matter has a shaft which is surrounded by a deformable hollow cylindrical shell. The ends of the shell are mounted on antifriction bearings which surround the shaft, and the intermediate portions of the shell can be deformed, to conform to the outlines of adjacent portions of the printing cylinder, by inflatable plenum chambers which are installed in sleeves surrounding the shaft so that each plenum chamber bears against the shaft and urges the respective sleeve radially of the shell. Additional antifriction bearings are installed between the internal surface of the shell and the ends of the sleeves which flank a larger-diameter central portion of the shaft. The shaft has a metallic tube with a set of longitudinally extending internal reinforcing ribs. The shell can be made of one or more layers of plastic material which is reinforced by fibers, such as carbon filaments.

20 Claims, 2 Drawing Sheets

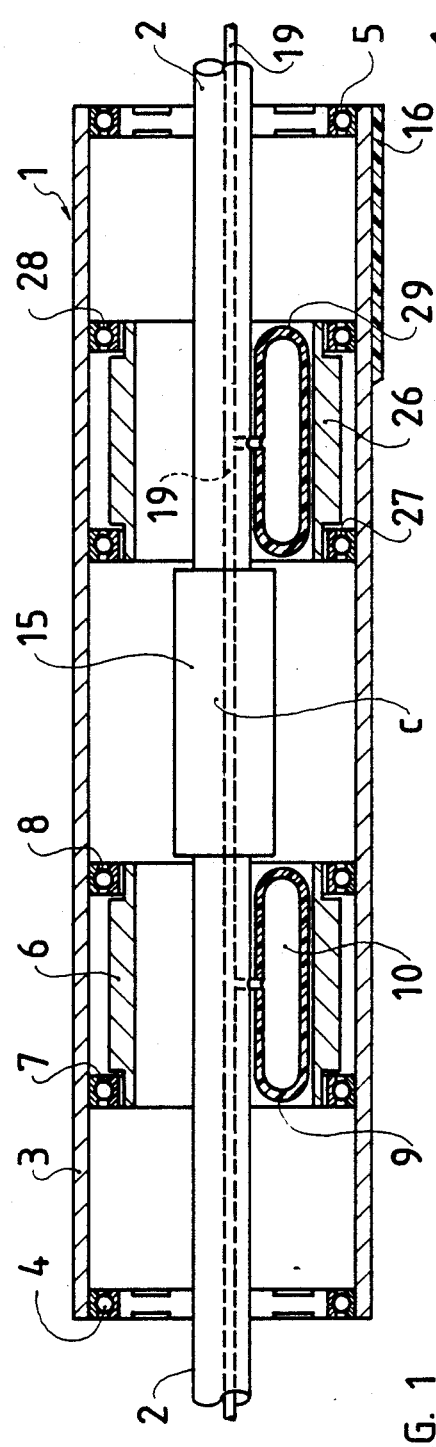
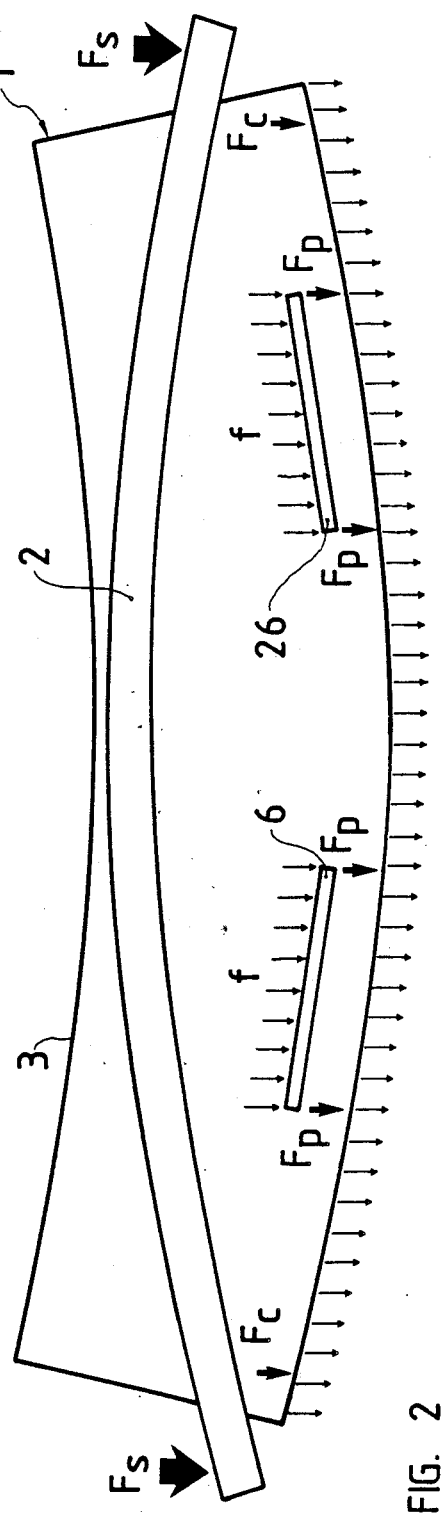
FIG. 1
FIG. 2

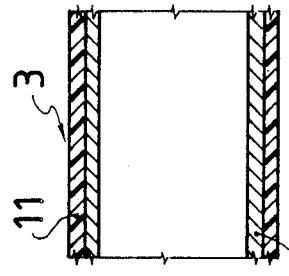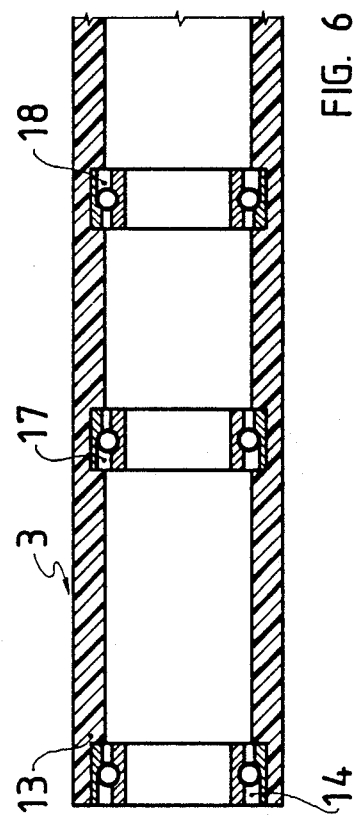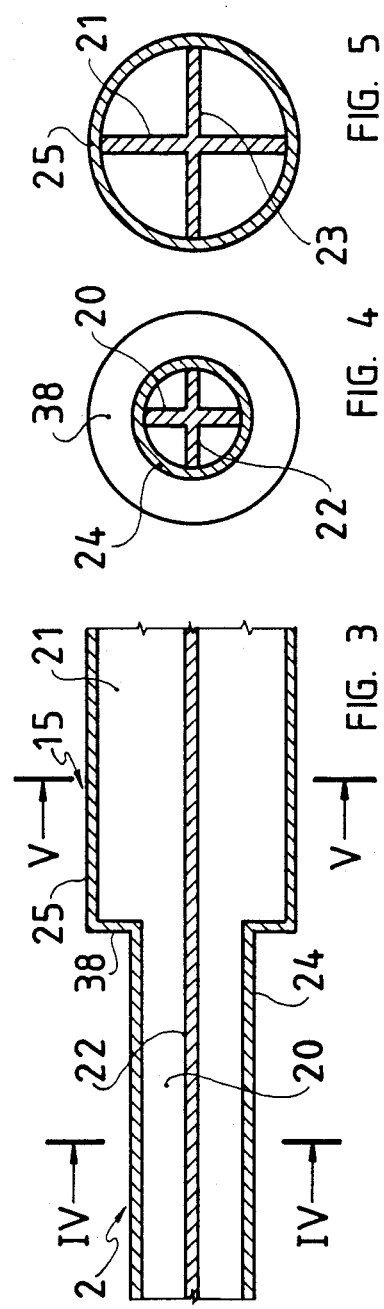

ROLL FOR USE IN ROTARY PRINTING PRESSES AND THE LIKE

BACKGROUND OF THE INVENTION

The invention relates to improvements in rolls of the type often used in rotary printing presses wherein they cooperate with printing cylinders to define nips for running webs of paper, foil or other strip or sheet material, for example, webs or strips of wrapping or packing material.

It is customary to employ in a rotary printing press a deformable roll which cooperates with the printing cylinder and whose deformability is intended to be sufficiently pronounced to ensure that the nip of such roll with the printing cylinder will have a desired width all the way from the one to the other end of the printing cylinder. In other words, the roll should cooperate with the printing cylinder in order to ensure that the printing cylinder will bear against the running web with equal force in each and every region of the nip. This guarantees that the image which is applied to the running web is sharp along the marginal portions as well as in each region between the marginal portions of the web.

Heretofore known rolls are capable of meeting the above outlined requirements if the nips of such rolls with printing cylinders are relatively short. However, conventional rolls are unsatisfactory when the nip is very lone (e.g., up to and even in excess of three meters) and/or when a relatively long printing cylinder is driven at a high rotational speed. It has been found that the dynamic stability of relatively long conventional rolls is unsatisfactory as well as that the image which is applied to a web running through a nip having a length of several meters and being defined in part by a rapidly rotating cylinder is non-uniform because the outline of the roll does not adequately conform to the outline of the printing cylinder. The latter undergoes deformation when the printing press is in use and, once its length and/or its RPM exceed a certain value, a conventional roll is incapable of conforming to the outline of the deformed printing cylinder when the press is in actual use. In order to adequately conform to the shape of a deformed printing cylinder and to the shape of a printing cylinder whose deformation varies during each revolution, the roll would have to yield to often extensive radial deforming and/or twisting stresses at a frequency and/or to an extent which cannot be achieved with heretofore known rolls. This is due, in part, to the fact that the mass of a conventional roll which cooperates with a long or very long printing cylinder (e.g., a printing cylinder which is 3 meters long) is excessive so that the inertia of the roll prevents it from rapidly and repeatedly conforming to the changing shape of the printing cylinder. Such relatively heavy rolls tend to vibrate, and this also affects the quality of the image which is applied to a web running through the nip of the roll and a printing cylinder. In fact, the frequency and/or amplitude of vibrations which develop in printing presses employing long and heavy printing cylinders and long and heavy companion rolls can be so pronounced that the presses must be operated at much less than their rated speed, with attendant losses in output, in order to avoid damage to or destruction of the machine.

OBJECTS AND SUMMARY OF THE INVENTION

An object of the invention is to provide a novel and improved roll which can be used in a rotary printing press or for other purposes and which is constructed and assembled in such a way that it can undergo frequent and extensive deformation without performing any, or any noticeable, vibratory and/or other stray movements.

Another object of the invention is to provide a roll wherein the customary hollow cylindrical shell which spacedly surrounds its carrier can be deformed in a novel and improved way.

A further object of the invention is to provide novel and improved means for rotatably mounting the shell on its carrier.

An additional object of the invention is to provide a rotary printing press which embodies one or more rolls of the above outlined character.

Still another object of the invention is to provide the roll with a novel and improved carrier and with a novel and improved shell.

A further object of the invention is to provide a novel and improved combination of a printing cylinder and a companion roll in a rotary printing press.

Another object of the invention is to provide a roll which can be installed in existing printing presses or other types of machines as a superior substrate for heretofore known rolls.

The invention is embodied in a roll which can be used with particular advantage in a rotary printing press to define with a deformable printing cylinder a nip for a running web of paper or the like. The improved roll comprises an elongated carrier (such as an elongated hollow horizontal shaft), a deformable hollow cylindrical shell which spacedly surrounds the carrier, and means for deforming the shell. In accordance with a feature of the invention, the deforming means includes at least one pneumatic deforming unit which is disposed in the shell to react against the carrier and to bear against the shell from within. The deforming unit can comprise a sleeve which surrounds the carrier, bearing means interposed between the sleeve and the shell, and at least one inflatable plenum chamber which is disposed within the sleeve and can urge the sleeve radially of the shell. The deforming means preferably comprises at least two pneuamtic deforming units one of which is nearer to one end and the other of which is nearer to the other end of the shell. The two units are preferably mirror symmetrical to each other with reference to a plane which extends at right angles to the axis of the shell midway between the ends of the shell. The bearing means of each deforming unit preferably includes two antifriction bearings which are interposed between the end portions of the respective sleeves and the shell.

The carrier can be provided with means (such as one or more channels or bores) which serve to connect the plenum chamber or chambers with a suitable source of compressed gaseous fluid (e.g., with an air compressor).

At least a portion of the shaft which constitutes or forms part of the carrier can be made of sheet steel. For example, the shaft can include a metallic tube and reinforcing means in the tube. Such reinforcing means can have a substantially cruciform cross-sectional outline and can define with the tube a plurality of cells or compartments. The shaft preferably includes a larger-diameter portion between the at least two deforming units and smaller-diameter portions which are surrounded by the deforming units.

The shell can be made of a plurality of different materials; for example, at least a portion of the shell can be made of a fiber-reinforced plastic material, such as an epoxy resin which is reinforced by carbon filaments. The outer race or races of the antifriction bearing or bearings of the bearing means of the deforming unit or units can be recessed into the internal surface of such compound shell. If desired, the shell can be made of a plurality of coaxial cylindrical layers which may but need not be made of the same material or materials.

Antifriction bearings can be interposed between the ends of the shell and the carrier.

Each plenum chamber can include an envelope which is or can be made of an elastomeric material and which preferably receives a compressed gaseous fluid from a suitable source by way of the carrier.

In accordance with a presently preferred embodiment of the invention, the deforming means is arranged to apply to the shell deforming forces at a plurality of locations which are spaced apart from each other in the longitudinal direction of the shell. This enables the shell to readily conform to the shape of the printing cylinder, i.e., to ensure that the width of each and every portion of the nip which is defined by the improved roll with a printing cylinder matches or closely approximates an optimum width. The arrangement is or can be such that each of two or more inflatable plenum chambers can receive or discharge a gaseous fluid independently of one or more other plenum chambers; this further enhances the ability of the roll to conform the shape of its shell to the shape of the printing cylinder.

The novel features which are considered as characteristic of the invention are set forth in particular in the appended claims. The improved roll itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an axial sectional view of a roll with two deforming units which embodies one form of the invention;

FIG. 2 is a diagram showing the manner in which the plenum chambers of deforming means for the shell of the roll of FIG. 1 can deform the shell and the carrier;

FIG. 3 is a fragmentary axial sectional view of a presently preferred carrier for use in the roll of FIG. 1;

FIG. 4 is a sectional view as seen in the direction of arrows from the line IV—IV of FIG. 3;

FIG. 5 is a sectional view as seen in the direction of arrows from the line V—V of FIG. 3;

FIG. 6 is a fragmentary axial sectional view of a modified shell with the outer races of three antifriction bearings recessed into the internal surface of the shell; and FIG. 7 is a fragmentary axial sectional view of a third shell which contains several coaxial layers consisting of different materials.

DESCRIPTION OF PREFERRED EMBODIMENTS

Referring first to FIG. 1, there is shown a roll 1 which can be used in conjunction with a deformable printing cylinder (not shown) to define therewith a nip N for a running web of paper, cardboard, metallic foil, plastic foil or other flexible material which is to be provided with printed matter or which is to be treated in another way during travel through the nip N. The roll 1 comprises a carrier 2 in the form of an elongated horizontal shaft whose end portions are or can be non-rotatably mounted in suitable bearings in the frame or housing (not shown) of the printing press and which is spacedly surrounded by a deformable hollow cylindrical shell 3. The axis of the shell 3 normally coincides with the axis of the carrier 2. The illustrated shell 3 has an inner layer of a metallic material (such as steel) and an outer layer 16 of elastomeric material (only a small portion of the outer layer 16 can be seen in the lower right-hand portion of FIG. 1). For example, the outer layer 16 can consist of natural or synthetic rubber.

The ends of the shell 3 are rotatable on antifriction bearings 4 and 5 whose inner races are supported by the adjacent portions of the carrier 2. These bearings center the ends of the shell 3 on the carrier 2 and maintain the adjacent portions of the outer layer 16 in contact with the peripheral surface of the printing cylinder when the nip N does not receive a running web of paper or the like. The forces with which the bearings 4, 5 urge the adjacent portions of the shell 3 toward the printing cylinder (the latter is assumed to be installed at a level below the roll 1, as seen in FIG. 1 or 2) are indicated in FIG. 2 by the arrows $F_c$. The forces $F_c$ develop as a result of the application of forces $F_s$ to the adjacent portions of the carrier 2, e.g., by means of fluid-operated motors which urge the end portions of the carrier downwardly, i.e., toward the printing cylinder. The pistons or piston rods of such motors are operatively connected to the carrier 2 and are reciprocable in their respective cylinder chambers in a manner well known from the art of printing presses, calenders and like machines. The carrier 2 transmits the forces $F_s$ to the respective bearings 4, 5 which, in turn, cause the end portions of the outer layer 16 to apply to the printing cylinder forces $F_c$ thus ensuring that the marginal portions of the web running through the nip N are acted upon with a force which is best suited to ensure the application of a high-quality image.

In accordance with a feature of the invention, the roll 1 further comprises means for deforming the shell 3 at one or more locations intermediate the antifriction bearings 4 and 5, and such deforming means of the roll 1 of FIG. 1 comprises two deforming units which are mirror symmetrical to each other with reference to a plane extending at right angles to the common axis of the carrier 2 and shell 3 midway between (at C) the axial ens of the shell 3. The left-hand deforming unit of FIG. 1 comprises a cylindrical sleeve 6 whose end portions are surrounded by antifriction bearings 7, 8 and which confines at least one inflatable plenum chamber 9 of elastomeric material (such as rubber). The internal space 10 of the plenum chamber 9 can receive a compressed gaseous fluid (such as air) from a suitable source (not shown), e.g., an air compressor of any conventional design. The means for connecting the source of compressed gas with the internal space 10 of the plenum chamber 9 comprises one or more conduits in the form of bores or holes 19 which are machined into or otherwise formed in the carrier 2. The connection further comprises suitable valve means and/or flow restrictor means and/or means for automatically regulating the pressure in the chamber 9 so as to select the forces with which the sleeve 6 urges the outer races of the antifriction bearings 7 and 8 against the internal surfaces of the adjacent portions of the shell 3 in a direction toward the printing cylinder. For example, the printing press can be equipped with conventional pressure gauges which monitor the pressure in spaced-apart portions of the nip N and transmit signals which regulate the pressure of gaseous fluid in the internal space 10 of the plenum chamber 9. Alternatively, the printing press can be equipped with means for monitoring the quality of the image which is transferred to the running web during travel through the nip N and for increasing or reducing the pressure in the plenum chamber 9 in dependency upon the quality of the monitored portion of the image.

The right-hand deforming unit of FIG. 1 comprises a sleeve 26, two antifriction bearings 27, 28, and an inflatable plenum chamber 29. The latter can receive or discharge compressed gaseous fluid by way of one or more channels in the carrier 2. For the sake of simplicity, FIG. 1 shows a single channel 19 which communicates with the internal spaces of both plenum chambers 9, 29.

The carrier 2 has a centrally located larger-diameter portion 15 (omitted in FIG. 2) which is flanked by the two deforming units, and smaller-diameter portions which are spacedly surrounded by the sleeves 6 and 26. The inflatable plenum, chambers 9, 29 react against the adjacent parts of the respective smaller-diameter portions of the carrier 2 and bear against the internal surfaces of the respective sleeves 6, 26 to urge the sleeves radially of the carrier 2 and shell 3 and to thereby urge the respective portions of the shell 3 toward the printing cylinder. The pressure in each of the plenum chambers 9, 29 can be varied within a desired range so as to ensure that the outline of the shell 3 in the region of the nip N will invariably closely follow the outline of the adjacent portion of the printing cylinder.

The deformation of the carrier 2 and shell 3 is greatly exaggerated in FIG. 2 for the sake of clarity. As can be seen in FIG. 2, the forces $F_s$ bring about a deformation of the carrier 2 in a first direction (the median portion of the carrier 2 tends to move radially and away from the median portion of the nip N) whereas the forces $F_p$ which are applied to the shell 3 by the antifriction bearings 7, 8 and 27, 28 tend to deform the shell in the opposite direction so that the median portion of the shell 3 tends to move toward the printing cylinder. The curvature of the shell 3 in the region of the nip N conforms to the curvature of the printing cylinder. As mentioned above, the printing cylinder is likely to undergo deformation when the press is in use, and the two deforming units (in cooperation with the carrier 2 and antifriction bearings 4, 5) enable the shell 3 to undergo deformation to the extent and at the frequency which are required to ensure that the width of the nip N will remain constant. More specifically, the roll 1 ensures that the magnitude of forces $F_r$ acting upon the web in the nip N is constant all the way from the one to the other end of the nip. The reference characters f denote in FIG. 2 the forces which are applied by the plenum chambers 9, 29 to the respective sleeves 6, 26 in response to admission of compressed gaseous fluid into the internal spaces of such plenum chambers. The forces f generate forces $F_p$ which are applied to the shell 3 by the bearings 7, 8, 27, 28 at longitudinally spaced apart locations between the antifriction bearings 4 and 5 at the ends of the shell. It will be seen that the shell 3 is acted upon at six longitudinally spaced-apart locations and that the magnitude of forces $F_p$ can be varied by changing the pressure in the respective plenum chambers. The magnitude of forces $F_c$ at the ends of the shell 3 can be varied by changing the corresponding forces $F_s$. It has been found that such distribution of bending forces which act upon the shell 3 normally suffices to ensure that the outline of the shell 3 will accurately conform to the outline of the printing cylinder. However, the number of deforming units, and hence the number or locations where the deforming unit or units can apply deforming forces to the shell 3 between the bearings 4 and 5, can be varied by reducing the number of deforming units to one or by increasing the number of deforming units to three or more. An advantage of rolls which employ several deforming units is that the deformation of selected portions of the shell can be brought about without the need for operation with a highly compressed gaseous fluid, i.e., relatively low pressures in the plenum chambers suffice to ensure adequate bending or flexing of the corresponding portions of the shell 3. This is especially important in connection with the treatment of certain types of webs which cannot or should not stand pronounced forces ($F_r$) during travel through the nip N. For example, very thin film-like foils of plastic material cannot be subjected to very pronounced pressures.

The plenum chambers 9 and 29 (each of which can comprise one or more bellows reacting against the carrier 2 and bearing against the respective sleeve) can compensate for at least some manufacturing and/or assembling tolerances. For example, the plenum chambers 9 and 29 can compensate for deformation of the carrier 2, shell 3 and/or sleeves 6, 26, and the compensation by one of the plenum chambers may but need not match that by the other plenum chamber. Thus, the deformation of shell 3 in the region of the plenum chamber 9 may but need not equal the defomation of the shell 3 in the region of the plenum chamber 29. In spite of such different deformation, the two plenum chambers can cause the adjacent portions of the shell 3 to bear upon the printing cylinder or upon the web in the nip N with the same force $F_r$. Moreover, the deformation of plenum chamber 9 and/or 29 in the longitudinal direction of the respective sleeve 6 and/or 26 can vary, depending upon the extent of deformation of the respective sleeve and/or the adjacent portion of the carrier 2 and/or the adjacent portion of the shell 3. Nevertheless, the magnitude of forces f can be the same all the way between the respective pair of antifriction bearings 7, 8 or 27, 28. This is shown schematically in FIG. 2 wherein the illustrated portions of the sleeves 6, 26 are inclined in the same directions and to the same extent as the adjacent portions of the shell 3.

FIGS. 3 to 5 show one presently preferred from of the carrier 2. As already explained with reference to FIG. 1, the median portion 15 of the carrier 2 has a diameter which exceeds those of the portions surrounded by the sleeves 6, 26 and the inner races of the antifriction bearings 4, 5. This ensures that the median portion 15 of the carrier 3 exhibits a more pronounced resistance to deformation which is in contrast to heretofore known carriers having constant diameters from end to end or being weakened in the middle. The carrier 2 is hollow and includes an elongated tube having a larger-diameter portion 25 in the middle (at 15) and smaller-diameter portions 24 at the ends of the portion 25. The portions 24, 25 of the tube can be made of sheet steel stock, and they are reinforced from within by reinforcing means including longitudinally extending ribs 21, 23 in the larger-diameter portion 25 and longitudinally extending ribs 20, 22 in the smaller-diameter portions 24. The ribs 20, 22 and 21, 23 impart to the reinforcing means a substantially cruciform cross-sectional outline with a plurality of compartments or cells between the ribs. Disc-shaped intermediate portions in the form of flanges 38 (only one shown) between the ends of the tubes 24, 25 can be welded or otherwise more or less permanently secured to the tubes.

Instead of the disc-shaped flanges 38, the carrier 2 can comprise hollow frustoconical intermediate portions which connect the portions 24 of the composite tube of the carrier 2 with the centrally located larger-diameter portion 25. One of such frustoconical intermediate portions is indicated in FIG. 3 by phantom lines, as at 138. The ribs 20, 22 and 21, 23 as well as the intermediate portions 38 or 138 can be made of sheet steel stock, the same as the portions 24, 25 of the composite tube.

An important advantage of the carrier 2 of FIGS. 3 to 5 is that its weight and mass of a solid metallic carrier even though its resistance to deformation is highly satisfactory and suffices for use in the roll of a printing press or the like. A reduction of the mass and weight of the carrier 2 is desirable and advantageous because this reduces the likelihood of vibrations and other stray movements which could affect the quality of printed matter on the web which is caused to run through the nip N.

FIG. 6 shows one presently preferred form of a shell 3 which can be used in the improved roll. The shell 3 of FIG. 6 comprises a tube 13 which is made of a piurality of different materials, for example a synthetic plastic substance (such as an epoxy resin) reinforced by batches of fibrous material, preferably carbon filaments. This enhances the rigidity of the shell while contributing to a desirable reduction of mass and weight with attendant reduction of the likelihood of uncontrollable vibrations and/or other stray movements when the roll embodying the shell 3 of FIG. 6 is in use in a rotary printing press or in a like machine. The carbon filaments can form a relatively thin layer which is convoluted around the innermost layer of the plastic material and is surrounded by the outermost layer of such plastic material. The tube 13 of the shell 3 of FIG. 6 can be provided with several alternating layers of epoxy resin and carbon filaments, depending upon the desired strength and rigidity of the shell. It is also possible to apply two layers of carbon filaments with one layer forming a set of helical convolutions extending in one direction and the other layer forming helical convolutions which cross the convolutions of the one layer. This even further enhances the rigidity of the shell. The two or more layers of carbon filaments or other fibrous material can be convoluted on a core to be thereupon embedded in a mass of epoxy resin which is allowed to set in order to complete the making of the tube 13. It has been found that the just outlined process can result in the making of a shell 3 whose weight is a small fraction (e.g., between 20 and 25 perent) of the weight of a metallic shell or a shell having a metallic inner layer and a plastic outer layer (such as the outer layer 16 of the shell 3 shown in FIG. 1).

As can be seen in FIG. 6, the outer races of the antifriction bearings 14, 17, 18 (which can correspond to the bearings 4, 7 and 8 of FIG. 1) are at least partially embedded in the internal surface of the tube 13 which forms part of the shell 3. Such mounting of the outer races ensures that the sleeves of the deforming units remain in selected axial positions and deform the shell 3 at desired distances from the respective ends of the shell. The entire shell 3 of FIG. 6 can be made of a composition including an epoxy resin or another plastic material which is reinforced by carbon filaments (not specifically shown) or the like.

The shell 3 of FIG. 7 comprises an inner layer 12 of metallic material (e.g., sheet steel) and an outer layer 11 which can be produced in a manner as disclosed in connection with the tube or pipe 13 of FIG. 6, i.e., it can constitute a mass of epoxy resin reinforced with carbon filaments or the like. The metallic layer 12 can be thin or extremely thin and can merely serve as a substrate for the formation of the layer 11 thereon. This ensures that the weight of the roll embodying the shell 3 of FIG. 7 is determined primarily by the outer layer 11.

An advantage of the shell 3 of FIGS. 6 and 7 is that its weight is a small fraction of a metallic shell while its ability to resist undesirable deformation at least matches that of a conventional metallic shell. This renders it possible to rotate the printing cylinder (and hence the shell 3) at a very high speed without risking defective imprinting an/or undesirable vibrations of the printing cylinder and roll 1.

Without further analysis, the foregoing will so fully reveal the gist of the prsent invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A roll, particularly for use in rotary printing presses to define with a printing cylinder a nip for a running web of paper or the like, comprising an elongated carrier; a deformable hollow cylindrical shell spacedly surrounding said carrier, at least a portion of said shell containing a plurality of different materials, and said portion of said shell including an epoxy resin which is reinforced by carbon filaments; and means for deforming said shell, including at least one pneumatic deforming unit disposed in said shell to react against said carrier and to bear against the shell from within.

2. A roll, particularly for use in rotary printing presses to define with a printing cylinder a nip for a running web of paper or the like, comprising an elongated carrier; a deformable hollow cylindrical shell spacedly surrounding said carrier, said shell having first and second ends; and means for deforming said shell, including at least two pneumatic deforming units disposed in said shell to react against said carrier and to bear against the shell from within, one of said units being nearer to said first end and another of said units being nearer to said second end, and each of said deforming units comprising a sleeve surrounding said carrier, bearing means interposed between the respective sleeve and said shell, and at least one inflatable plenum chamber disposed within the respective sleeve and arranged to urge the respective sleeve radially of said shell, the bearing means of each of said units including at least one antifriction bearing having an outer race which is recessed into said shell.

3. A roll, particularly for use in rotary printing presses to define with a printing cylinder a nip for a running web of paper or the like, comprising an elongated carrier; a deformable hollow cylindrical shell spacedly surrounding said carier, said shell having first and second ends; and means for deforming said shell, including at least two pneumatic deforming units disposed in said shell to react against said carrier and to bear against the shell from within, one of said units being nearer to said first end and another of said units being nearer to said second end, and each of said deforming units comprising a sleeve surrounding said carrier, bearing means interposed between the respective sleeve and said shell, and at least one inflatable plenum chamber disposed within the respective sleeve and arranged to urge the respective sleeve radially of said shell, the sleeve of each of said units having first and second end portions, and each of said bearing means including first and second antifriction bearings surrounding the respective end portions of the corresponding sleeve.

4. A roll, particularly for use in rotary printing presses to define with a printing cylinder a nip for a running web of paper or the like, comprising an elongated carrier, said carrier including a hollow shaft, and said shaft comprising a metallic tube and reinforcing means provided in said tube; a deformable hollow cylindrical shell spacedly surrounding said carrier, said shell having first and second ends; and means for deforming said shell, including at least two pneumatic deforming units disposed in said shell to react against said carrier and to bear against the shell from within, one of said units being nearer to said first end and another of said units being nearer to said second end, and each of said deforming units comprising a sleeve surrounding said carrier, bearing means interposed between the respective sleeve and said shell, and at least one inflatable plenum chamber disposed within the respective sleeve and arranged to urge the respective sleeve radially of said shell.

5. The roll of claim 4, wherein said reinforcing means extends longitudinally of said tube and has a cruciform cross-sectional outline.

6. A roll, particularly for use in rotary printing presses to define with a printing cylinder a nip for a running web of paper or the like, comprising an elongated carrier; a deformable hollow cylindrical sheel spacedly surrounding said carrier, said shell having first and second ends; and means for deforming said shell, including at least two pneumatic deforming units disposed in said shell to react against said carrier and to bear against the shell from within, one of said units being nearer to said first end and another of said units being nearer to said second end, and each of said deforming units comprising a sleeve surrounding said carrier, bearing means interposed between the respective sleeve and said shell, and at least one inflatable plenum chamber disposed within the respective sleeve and arranged to urge the respective sleeve radially of said shell.

7. A roll, particularly for use in rotary printing presses to define with a printing cylinder a nip for a running web of paper or the like comprising an elongated carrier; a deformable hollow cylindrical shell spacedly surrounding said carrier, said shell having first and second ends; and means for deforming said shell, including at least two pneumatic deforming units disposed in said shell to react against said carrier and to bear against the shell from within, one of said units being nearer to said first end and another of said units being nearer to said second end, and each of said deforming units comprising a sleeve surrounding said carrier, bearing means interposed between the respective sleeve and said shell, and at least one inflatable plenum chamber disposed within the respective sleeve and arranged to urge the respective sleeve radially of said shell.

8. The roll of claim 7, wherein said at least two units are substantially mirror symmetrical to each other with reference to a plane extending at right angles to the axis of said shell midway between said first and second ends.

9. The roll of claim 7, wherein said carrier is provided with means for connecting the plenum chambers of said units with a source of compressed gaseous fluid.

10. The roll of claim 9, wherein said connecting means comprises at least one channel in said carrier.

11. The roll of claim 7, wherein said carrier comprises a hollow shaft.

12. The roll of claim 7, wherein at lease a portion of said shell contains a plurality of different materials, said portion of said shell including a fiber-reinforced plastic material, and said shell comprising a plurality of substantially coaxial cylindrical layers.

13. The roll of claim 7, wherein at least a portion of said shell contains a fiber-reinforced plastic material.

14. The roll of claim 7, wherein said shell includes a plurality of coaxial cylindrical layers.

15. The roll of claim 7, further comprising antifriction bearings interposed between the ends of said shell and said carrier.

16. The roll of claim 7, wherein each of said deforming units includes at least one envelope of elastomeric material; and further comprising means for admitting a compressed gaseous fluid into said envelopes.

17. The roll of claim 7, wherein said deforming means includes means for applying to the shell deforming forces at a plurality of locations, said locations being spaced apart from each other in the axial direction of said shell.

18. The roll of claim 7, wherein said at least two units are substantially mirror symmetrical to each other with reference to a plane extending at right angles to the axis of said shell midway between said first and second ends, said carrier comprising a hollow shaft and being provided with means for connecting the plenum chambers of said units with a source of compressed gaseous fluid, and said connecting means comprising at least one channel in said carrier.

19. The roll of claim 7, comprising means mounting said shell for rotation relative to said carrier.

20. The roll of claim 7, wherein said carrier and said shell are substantially coaxial.

* * * * *